(12) United States Patent
Ghosh et al.

(10) Patent No.: US 6,557,077 B1
(45) Date of Patent: Apr. 29, 2003

(54) TRANSPORTABLE MEMORY APPARATUS AND ASSOCIATED METHODS OF INITIALIZING A COMPUTER SYSTEM HAVING THE SAME

(75) Inventors: Sukha R. Ghosh, Lilburn, GA (US); Paresh Chatterjee, Fremont, CA (US); Stephen Scott Piper, McDonough, GA (US); Marc C. Karasek, Duluth, GA (US); Basavaraj Gurupadappa Hallyal, Fremont, CA (US)

(73) Assignee: LSI Logic Corporation, Milpitas, CA (US)

( * ) Notice: Subject to any disclaimer, the term of this patent is extended or adjusted under 35 U.S.C. 154(b) by 124 days.

(21) Appl. No.: 09/612,054

(22) Filed: Jul. 7, 2000

(51) Int. Cl.[7] .............................................. G06F 12/00
(52) U.S. Cl. .......................... 711/118; 711/100; 711/135
(58) Field of Search .......................... 713/1, 2; 711/135, 711/100, 103, 118, 154; 710/10

(56) References Cited

U.S. PATENT DOCUMENTS

| | | | |
|---|---|---|---|
| 5,056,001 A | * | 10/1991 | Sexton .......................... 710/10 |
| 5,448,719 A | | 9/1995 | Schultz et al. |
| 5,677,890 A | | 10/1997 | Liong et al. |
| 5,784,548 A | | 7/1998 | Liong et al. |
| 5,809,331 A | * | 9/1998 | Staats et al. .................. 710/10 |
| 5,982,899 A | * | 11/1999 | Probst .......................... 380/25 |

OTHER PUBLICATIONS

User's Manual, Mylex DBB960, Battery Backup Module, Version 1.0, 1994.

* cited by examiner

Primary Examiner—Tuan V. Thai
(74) Attorney, Agent, or Firm—Carstens, Yee & Cahoon

(57) ABSTRACT

A transportable memory apparatus including cache memory and a backup battery is provided that is capable of being removed from a first computer system and installed within a second computer system. The transportable memory apparatus includes a control bus that provides appropriate signals such that the presence and status of the transportable memory apparatus can be detected in order to permit the computer system that includes the transportable memory apparatus to be appropriately initialized. As such, methods for initializing a computer system that may include a transportable memory apparatus are also provided.

15 Claims, 8 Drawing Sheets

TRANSPORTABLE MEMORY APPARATUS AND ASSOCIATED METHODS OF INITIALIZING A COMPUTER SYSTEM HAVING THE SAME

FIELD OF THE INVENTION

The present invention relates generally to computer that include cache memory and, more particularly, to a transportable memory apparatus that includes cache memory and associated methods of initializing a computer having a transportable memory apparatus.

BACKGROUND OF THE INVENTION

Generally, computers or computer systems have associated devices for storing data. The data may be stored on a relatively safe and recoverable non-volatile storage device. An example of a non-volatile storage device is a hard disk drive. The techniques or procedures for storing data on non-volatile storage devices are well known in the art. As the volume of data stored on non-volatile storage devices increases, however, so does the concern for data integrity and reliability.

When a file is written to a hard disk drive, the operating system transfers the data in the file generally in sections called blocks. A block of data is first sent to a memory controller, such as an integrated device electronics (IDE) controller or a small computer standard interface (SCSI) controller. After receiving the block of data, the controller sends an acknowledgement of receipt to the operating system. Upon receiving this acknowledgement, the operating system then considers the block to be safely stored in the storage device.

In a controller without cache memory, the memory controller transfers the data immediately to the storage device before an acknowledgement is sent back to the operating system. Many higher-end controllers have cache memories. Cache memory is higher-speed memory that stores data that has recently been retrieved from or is in the process of being transferred to a non-volatile storage device, thereby saving time by not requiring that the non-volatile storage device be accessed if the data is needed again in the near future. A memory controller (also termed a caching controller) that is associated with a cache memory sends, an acknowledgement to the operating system after the data is stored in the cache memory without waiting for the data to be stored in a non-volatile storage device.

Caching controllers generally employ one of two methods to handle data that has been written to a storage device, write-through cache and write-back cache. A caching controller employing the first method, write-through cache, writes the block of data to two locations once the data is received, that is, the caching controller writes the data to both the cache memory and to the storage device. Because the data is written to cache memory, the data can be quickly accessed again if needed for later use. However, the data is also simultaneously stored in a safe manner in the storage device. Unfortunately, the time that is required to write the data from the operating system to the storage device according to a write-through cache method is greater than the time to write data directly to a storage device without passing through a caching controller. In fact, the total time to write data according to the write-through cache method is equal to the time to write data to the cache memory plus the time to write data to a storage device.

The second method, write-back cache, reduces the time requirements of the first method by writing the block of data only to the cache memory, instead of to both cache memory and the storage device. Therefore, the total time to write data is only the time required to write data to the cache memory. However, the data will only be written from the cache memory to the non-volatile storage device when the cache memory is full or when activity on the controller is low. Unfortunately, the write-back cache method necessitates that the storage device will go through periods of not containing any new or updated blocks of data with the new or updated blocks of data being, instead, maintained by the cache memory. As such, if the power supply fails, then the new blocks of data will be lost and non-recoverable since the cache memory is volatile. This loss of data is particularly problematic since the memory controller has previously sent an acknowledgement to the operating system indicating that the data was received by the storage device without providing any indication that the data had only been stored in cache memory. Upon receiving the acknowledgment, the operating system is no longer obligated to maintain the data and therefore cannot be relied upon to recover any data lost in cache memory.

Cache memory therefore has a central flaw. When power to the caching controller fails or is interrupted for any reason, the contents of the cache memory is generally lost or corrupted. As the size of cache memories increase, the potential for data loss also increases. Numerous techniques for data recovery and data storage have been developed to overcome this problem. One such attempt to resolve this problem is to have a battery backup for the cache memory.

One example of a conventional computer system 100 that includes a cache memory system 150 is depicted in FIG. 1. The cache memory system 150 is powered by the system power supply 130 and communicates with the computer system via system bus 115. The cache memory system includes cache memory 200, typically configured as a cache array, such as an Intel 21256 Dynamic Random Access Memory (DRAM). The cache memory system also includes a cache controller 160 for interacting with the central processing unit (CPU) 110 of the computer system and for generally controlling the operations of the cache memory system. As depicted in FIG. 1, the cache memory system also includes a refresh unit 177 that periodically refreshes the contents of the cache memory and a battery unit 176 for providing auxiliary power to the cache memory. In order to control the manner in which the cache memory is refreshed and the manner in which auxiliary power is provided to the cache memory, the cache memory system can also include a selector 180 that operates under control of the cache controller 160. As such, the cache memory system can be designed such that the battery unit provides power to the cache memory if the system power supply fails or if power to the cache memory is otherwise interrupted. As such, the cache memory system can retain the contents of the cache memory until such time that the power failure is rectified and the computer system can again be powered on, thereby permitting the contents of the cache memory to be transferred to main memory 120, typically a non-volatile memory device, for storage.

It is also advantageous for the cache memory 200 along with the associated battery and refresh units 176, 177 (collectively designated as 170 in FIG. 1) to be modular so as to be moved from one computer system and installed in another computer system. As such, in instances in which the cache controller 160 fails while the cache memory is dirty, the battery unit can supply auxiliary power to the cache memory in order to retain the contents of the cache memory while the modular cache memory and associated battery unit are removed from the computer system that has experienced the failure and are installed in another computer system. Upon powering up the new computer system, the dirty data can be flushed from the cache memory to main memory 120 such that no data is lost.

As a result of the removal of the cache memory from a first computer system and the installation of the cache memory in a second computer system, a number of problems arise in the manner in which the second computer system is initialized so as to identify the newly installed cache memory, to detect if the newly installed cache memory has dirty data, and to appropriately flush the dirty data to a non-volatile storage device of a second computer system. If the cache memory is not identified and the dirty data is not appropriately flushed, data may be lost or the integrity of the data may otherwise be compromised, notwithstanding removal of the cache memory from the computer system that has experienced the failure and the installation of the cache memory in a different computer system.

SUMMARY OF THE INVENTION

A transportable memory apparatus including cache memory is provided that is capable of being removed from a first computer system and installed within a second computer system. According to the present invention, the transportable memory apparatus includes a control bus that provides appropriate signals such that the presence and status of the transportable memory apparatus can be detected in order to permit the computer system that includes the transportable memory apparatus to be appropriately initialized. As such, methods for initializing a computer system that may include a transportable memory apparatus are also advantageously provided.

According to one embodiment, a transportable memory apparatus capable of being relocated from a first computer system to a second computer system is provided. The transportable memory apparatus includes cache memory for at least temporarily storing data transferred between a host processor and a memory storage device, such as a plurality of disk drives. The transportable memory apparatus also includes a battery for providing auxiliary power to the cache memory. The transportable memory apparatus further includes a power source selector for selectively providing power from either a system power supply or from the battery. Typically, the power source selector provides the cache memory with power from the system power supply. However, if the power source selector detects that the system power has fallen below a minimum system threshold, cache memory can be provided with auxiliary power from the battery, especially in instances in which the cache memory includes dirty data.

In this regard, the transportable memory apparatus can include a voltage comparator module that includes a first comparator for comparing the system power to the minimum system threshold. If the voltage comparator determines that the system power has fallen below the minimum system threshold, the voltage comparator of this embodiment will signal the power source selector. The voltage computer module can also include a second comparator for comparing the auxiliary power provided by the battery to a minimum battery threshold and for signaling the power source selector if the auxiliary power does fall below the minimum battery threshold.

The transportable memory apparatus of this embodiment also includes a control bus for interconnecting the transportable memory apparatus with the host processor. The control bus includes a battery backup enable channel for enabling the battery to provide auxiliary power, typically in instances in which the cache memory is dirty. The control bus also includes an identification channel for providing an indication to the host controller that the transportable memory apparatus is present. The control bus can further include a battery backup mode channel for indicating if the battery is currently providing auxiliary power to the cache memory. As such, the host processor can detect the presence of the transportable memory apparatus and can determine the status of the transportable memory apparatus, either upon initialization of the computer system or at any time thereafter.

In this regard, a method for initializing a computer system is also provided that initially determines if a transportable memory module is present, such as by examining an identification line of the control bus interconnecting the transportable memory module with the computer system. If the transportable memory module is present, it is determined if the configuration information stored by the transportable memory module and the memory storage device are consistent. If the configuration information stored by the transportable memory module and the memory storage device are consistent, the data stored by the transportable memory module is flushed to the memory storage device. As such, the method of this aspect of the present invention permits the transportable memory module and the memory storage device, such as one or more disk drives, to be transported from a first computer system to a second computer system, such as in the event of a system power failure or a hardware failure in the first computer system, while still facilitating the flushing of dirty data from the transportable memory module to the memory storage device once installed in the second computer system. If the configuration information stored by the transportable memory module and the memory storage device are inconsistent, however, an error message is issued.

The method of this embodiment to the present invention also determines if the transportable memory module has been transported from one computer system to another computer system. In this regard, the method determines if the transportable memory module has been transported between computer systems by comparing the configuration information stored by the transportable memory module and the configuration information stored by the non-volatile memory device of the first computer system. If the configuration information stored by the transportable memory module and a non-volatile memory device are different, it is determined that the transportable memory module has been transported between computer systems. If, however, the configuration information stored by the transportable memory module and the non-volatile memory device match, it is determined that the transportable memory module has not been transported. If it is determined that the transportable memory module has been transported from one computer system to another computer system, and if the configuration information stored by the transportable memory module and the memory storage device are consistent, the configuration information of the non-volatile memory device is restored by copying the configuration information of the transportable memory module to the non-volatile memory device.

In addition, in embodiments in which the memory storage device includes a plurality of disks, the consistency of the disks can be checked prior to determining if the configuration information stored by the transportable memory module and the memory storage device are consistent. If the plurality of disks are inconsistent, an appropriate error message can be issued.

According to another embodiment to the present invention, a method for initializing a computer system is provided in which the memory controller is initialized in different manners depending upon the presence of a transportable memory module or a more conventional cache memory device. In this regard, the method initially determines if cache memory contains data that is dirty. If the cache memory contains data that is dirty, the method determines if a transportable memory module is present that includes the cache memory. Thereafter, the memory controller is initialized with values identifying the size and type of the cache memory. At least in instances in which the cache memory contains data that is dirty, the memory controller is initialized with values obtained from the cache memory if the transportable memory module is present and with values obtained from a non-volatile memory device if a transportable memory module is not present. Once the memory controller has been initialized, dirty data stored by the cache memory can be flushed to the memory storage device. If, however, cache memory does not contain data that is dirty, the cache memory can be examined to detect the size and type of the cache memory, which values are subsequently utilized to initialize the memory controller.

In order to provide auxiliary power to the cache memory, the computer system typically includes a battery. As such, cache memory may be determined to contain data that is dirty by examining the battery backup enable channel of the control bus interconnecting the memory controller and the cache memory. If the battery backup enable channel indicates that the battery is enabled, cache memory will be determined to contain data that is dirty. In addition, a flag stored by the non-volatile memory device may be utilized to indicate that cache memory contains data that is dirty. As such, the flag stored by the non-volatile memory device may be examined to determine if the cache memory contains data that is dirty.

The transportable memory apparatus of the present invention includes cache memory and a battery for providing auxiliary power to the cache memory such that the transportable memory apparatus can be moved from a first computer system and installed in the second computer system without losing or otherwise impairing the integrity of any data stored by the cache memory. The transportable memory apparatus is also designed to provide signals indicative of its presence and status to the host computer for use during initialization and the like. As such, methods for initializing the host computer are also provided that determine the presence and status of a transportable memory apparatus and that flush any dirty data that has been stored by the cache memory of the transportable memory apparatus. In this regard, a method that insures the consistency of the configuration information of the various memory devices prior to flushing the dirty data is provided. In addition, a method of initializing the memory controller of a host computer system with values identifying the size and type of the cache memory is provided that determines if a transportable memory module is present and then initializes the memory controller with values identifying the size and type of a cache memory in different manners depending upon the presence or absence of a transportable memory module. As such, the transportable memory apparatus and associated methods of the present invention provide for the storage and recovery of dirty data in instances in which the system power falls below a predetermined minimum level or the host computer suffers some type of hardware failure requiring that the cache memory be transported to another computer for recovery of the dirty data.

BRIEF DESCRIPTION OF THE DRAWINGS

The invention is illustrated in the drawings in which like reference characters designate the same or similar parts throughout the figures of which.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
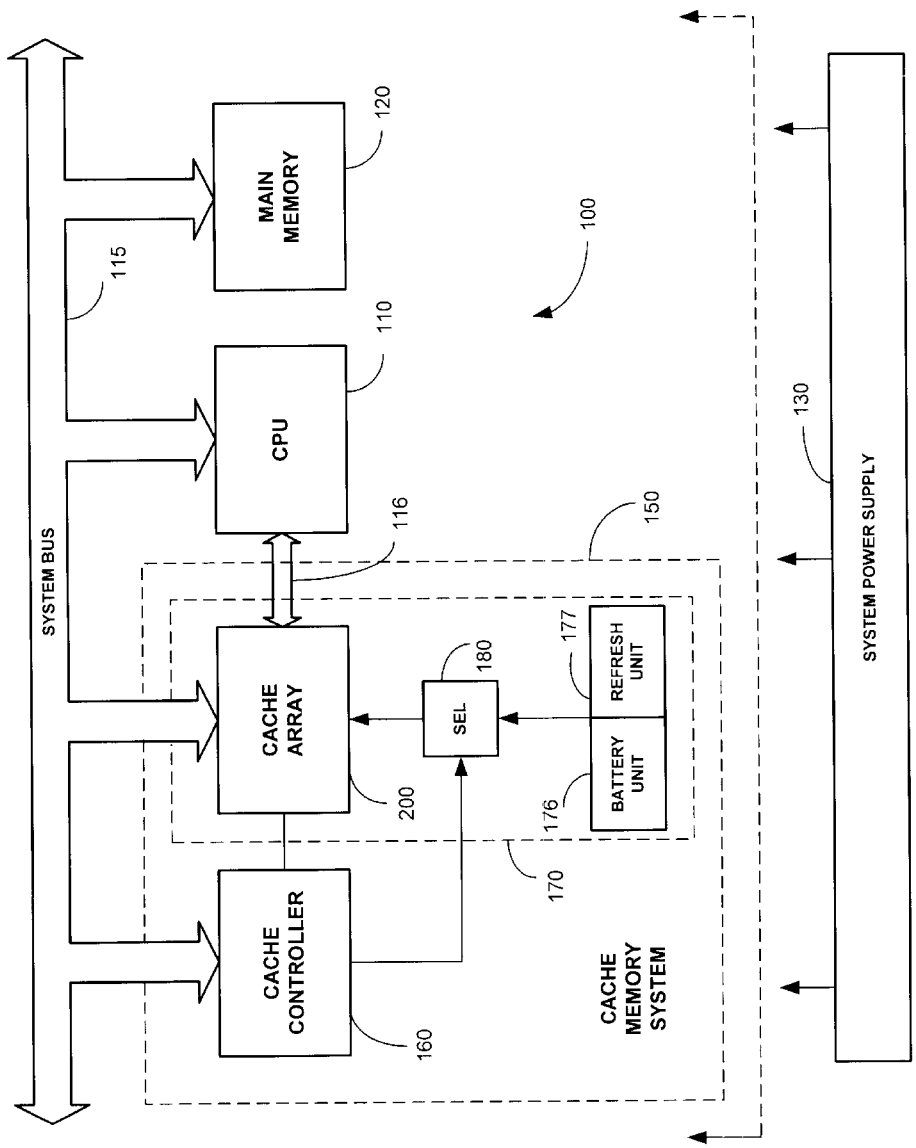
FIG. 1 illustrates a block diagram of a transportable cache memory system of the prior art.
Figure 2:
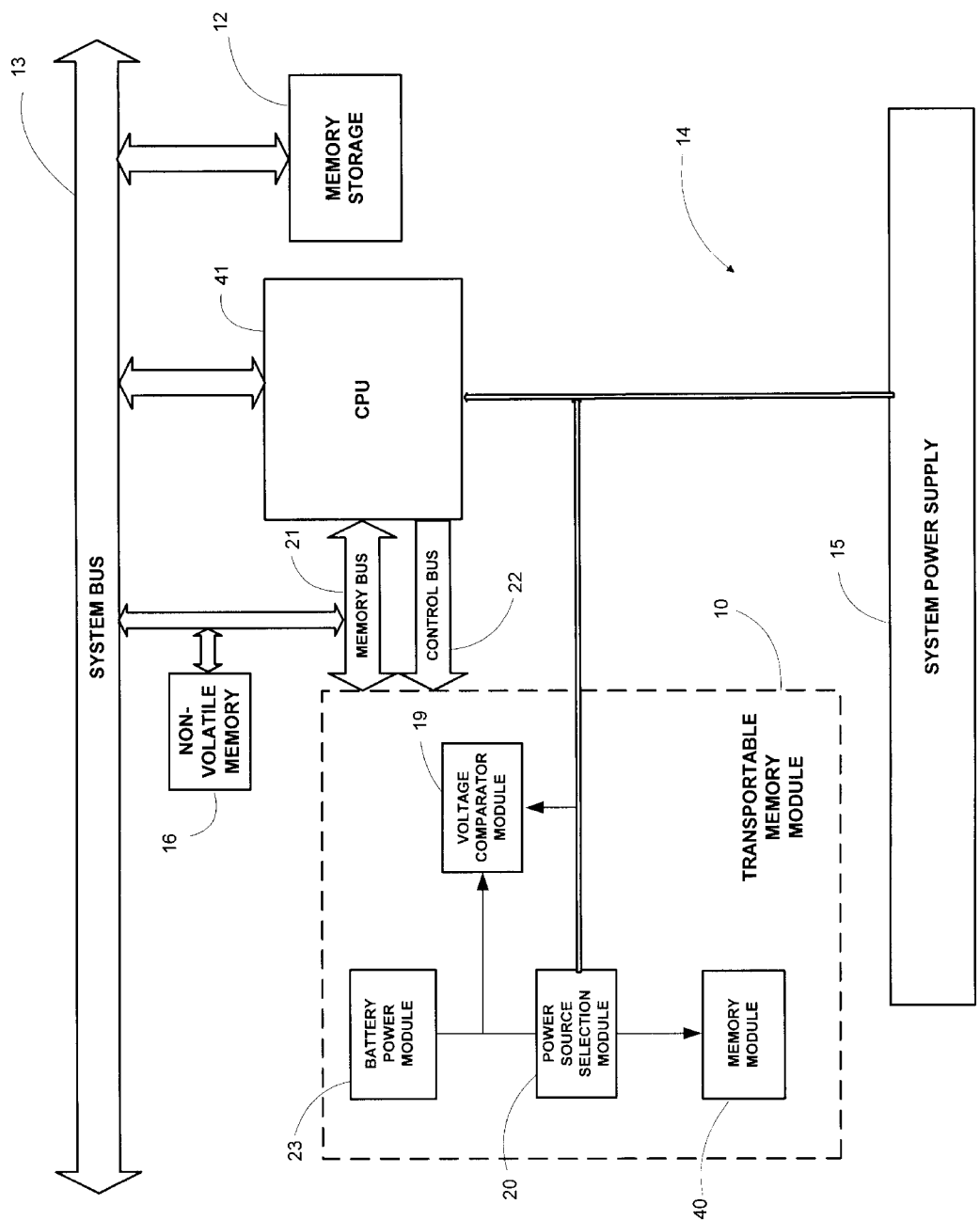
FIG. 2 illustrates a block diagram of a computer system including a transportable memory module according to one embodiment of the present invention.

Referring now to FIG. 2, a computer system 14 including a transportable memory apparatus 10 (TMA) according to one advantageous embodiment of the present invention is depicted. As described below, the computer system operates to provide cache memory, power source switching functions and memory reconfiguration functions during the activation or powering up of the computer system. For example, auxiliary power may be provided to the cache memory 40 in the event that the system power supply 15 should fail, thereby preserving the integrity of the data stored by the cache memory. If the power failure results from a disruption in the system power supply, the stored data may be downloaded to a memory storage device 12, such as one or more disk drives, during the next activation or power up sequence of the computer system after the disruption in the system power supply is remedied. Alternatively, if the power failure resulted from a failure within the computer system itself, such as a hardware failure, the TMA including the cache memory may be transported to another computer system. The memory storage device may also be connected to the other computer system such that the data stored by the cache memory may be downloaded to the memory storage device upon activating or powering up the other computer system.

Referring in more detail to FIG. 2, the TMA 10 is shown to be connected to and in communication with a host computer system 14. The host computer system includes a central processing unit (CPU) 41. The host computer system may also, if desired, comprise an internal or external memory storage device 12, a power supply 15, and a system bus 13 that connects the CPU 41 to the memory storage device 12. The host computer system may, if desired, be any computer system or controller that utilizes memory storage as discussed herein. An example of a host computer system is a DELL Poweredge 6300 computer system. The memory storage device may, if desired, be one or more memory disk drives used to store data or information. An example of a typical memory disk drive is a Seagate Cheetah disk drive.

The TMA 10 is typically connected to the host computer system 14 via an adapter slot or some other type of expansion slot. However, the transportable memory module can be connected to the host computer system in other manners, if so desired. As its name suggests, however, the transportable memory module is transportable and may, if desired, be removed from the host computer system and installed in another computer system (not shown). Once the TMA is installed in the other computer system, the TMA is designed to continue to function without loss of data stored in its memory. If desired, a standard cache memory module (not shown) may be substituted in the host computer system in place of the TMA, although the host computer system will be able to detect if the TMA is present or if a standard cache memory module is present, as described below.

Figure 3:
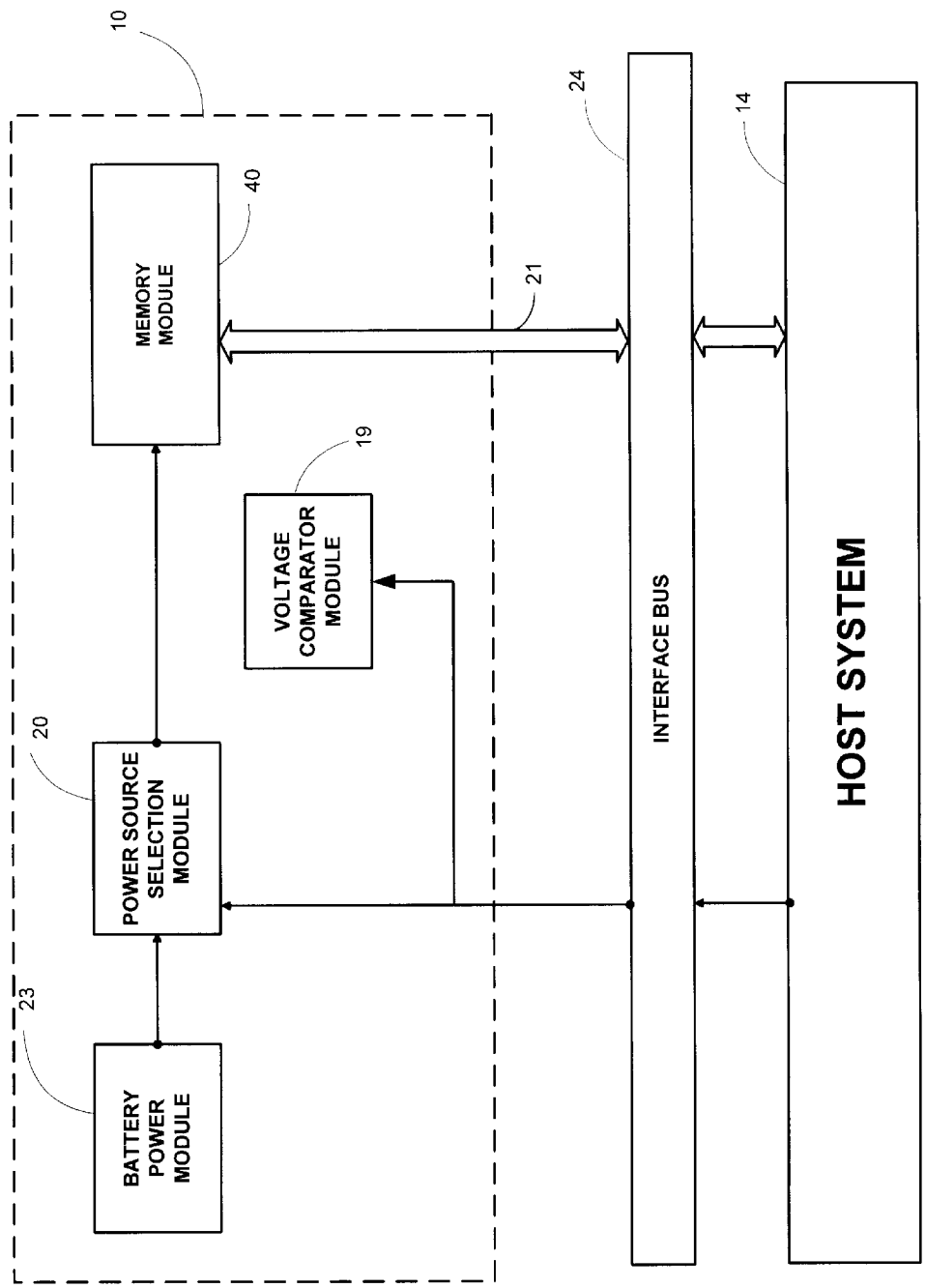
FIG. 3 illustrates a block diagram of a transportable memory module interfacing with a host computer system according to one embodiment of the present invention.

As shown in FIG. 2, the TMA 10 can communicate with the CPU 41 via a memory bus 21 and a control bus 22. If desired, however, the TMA may communicate with the host computer system via an interface bus 24, as shown in FIG. 3 The interface bus 24 may be a card edge connector having either its male or female connection attached to the host computer system 14 and its mating connection attached to the TMA. The interface bus provides the user with the option of inserting the TMA or inserting a standard cache memory module.

Either the TMA 10 or a standard cache memory module will provide the host computer system 14 with memory to store information or data during typical caching operations. Caching of data is a well known procedure of temporarily storing data or information in a special memory subsystem in which frequently referenced data values are duplicated for quick access. A cache memory stores the contents of frequently accessed memory locations and the addresses where these data items are otherwise stored in main memory, i.e., within the memory storage device 12. When the CPU 41 references an address in memory, the cache memory is first checked to determine whether the data stored at that address is stored in cache memory. If cache memory contains the data requested by the CPU, cache memory returns the data to the CPU 41. If cache memory does not contain the data requested by the CPU, a regular memory access occurs. Typical caching functions or operations are delineated in "Computer Organization and Architecture," by William Stallings (1990); and "The Indispensible PC Hardware Book," by Hans-Peter Messmer, Addison-Wesley (1997).

As depicted in FIGS. 2 and 3, the TMA 10 includes cache memory 40, a power source selector 20, a voltage comparator 19, and a battery 23. As illustrated, these elements are generally separate modules, but can be configured in other fashions, if so desired. In one embodiment, the power source selector is comprised of discrete logic that receives information on the state of the system power supply 15 and switches cache memory 40 between system power and auxiliary power provided by the battery 23 when the system power supply fails. Likewise, the voltage comparator 19 of one embodiment is comprised of discrete logic that senses both the system power level and the battery power level, and provides the power source selector with comparison data. As will be apparent, however, both the power source selector and voltage comparator can be embodied in other manners, if so desired. Likewise, a variety of different batteries can be employed, although one example of a typical battery is a Promark battery bearing part number BAT-NIMH-4.8-01.

Figure 4:
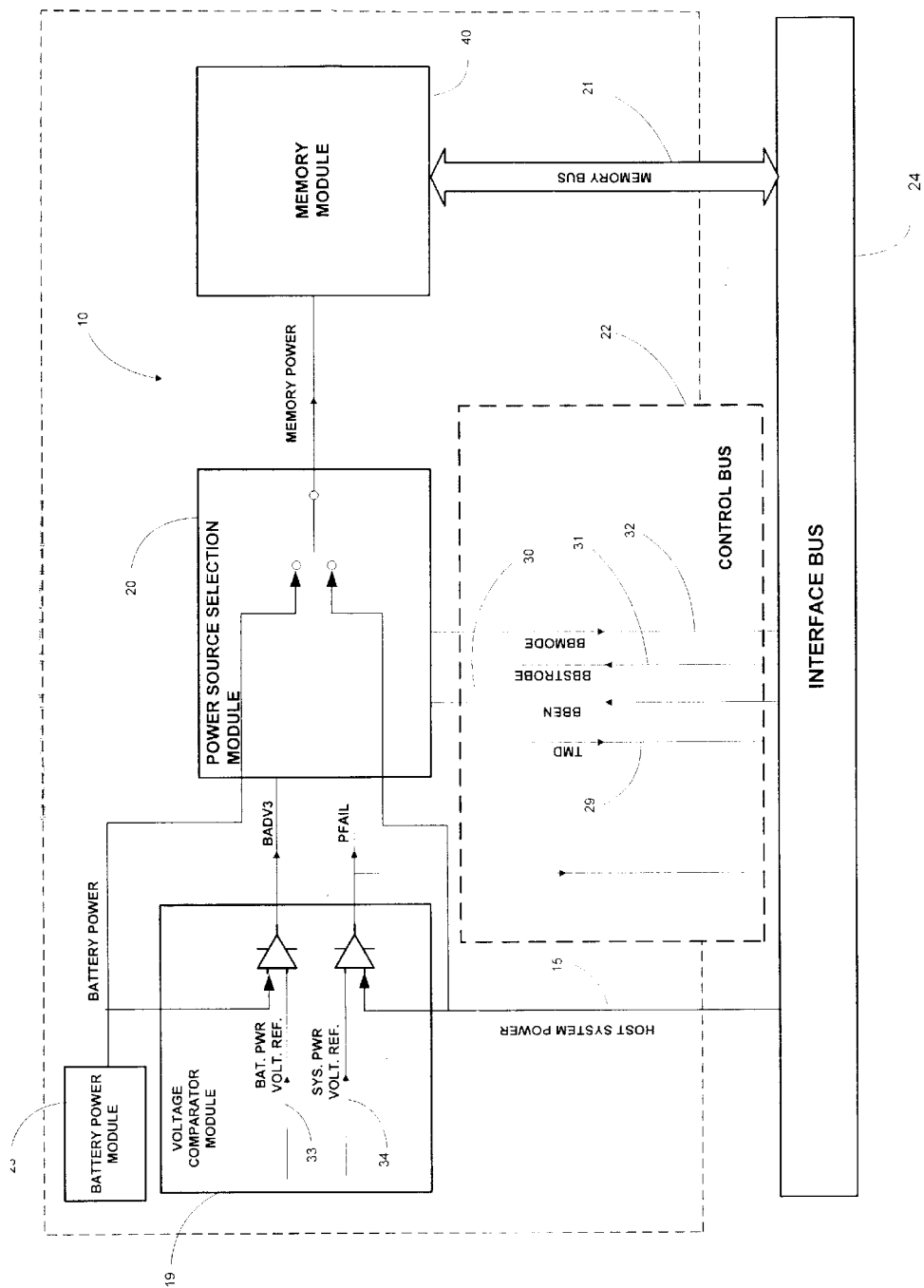
FIG. 4 illustrates a more detailed block diagram view of the transportable memory module of FIG. 3.

As shown in FIG. 4, the TMA 10 is in bi-directional communications with the host computer system 14 via a control bus 22 having a plurality of information or data channels for transmitting analog or, more typically, digital signals, either synchronously or asynchronously. The control bus can interconnect the TMA and the CPU 41 either directly or indirectly. For example, the control bus may directly interconnect the TMA and the CPU as depicted in FIG. 2 or the control bus may communicate with the CPU via an interface bus as shown in FIGS. 3 and 4.

The control bus 22 of the illustrated embodiment includes four data channels, namely, a battery backup enable channel 30 (BBEN) and a battery backup strobe channel 31 (BBSTROBE) that permit the host computer system 14 to provide signals to the TMA 10 and a battery backup mode channel 32 (BBMODE) and a TMA channel 29 that are provided by the TMA to the host computer system. BBEN is logically set by the host computer system to enable the battery backup function of the TMA. For example, BBEN is typically set if cache memory 40 contains dirty data to prevent the dirty data from being lost in the event of a system power failure. Conversely, if BBEN is logically reset by the host computer system, the battery backup function is disabled. The setting or resetting of BBEN may be at any convenient time or pulse duration. However, BBEN is typically set by the host computer system when data is stored to the cache memory. BBSTROBE is a stimulus from the CPU 41 to the TMA. BBSTROBE acts as a clocking signal from the host computer system to the TMA to cause BBEN to be read or latched.

With respect to the signals provided by the TMA 10 to the host computer system 14, BBMODE 32 provides an indication as to whether the TMA is actually operating in a battery backup mode of operation or, alternatively, whether BBEN on the TMA is set or reset. For example, the pin to which the TMA channel is connected can also be connected via a pull-up resistor to system power or some other predetermined voltage. As such, in the absence of a TMA, such as in instances in which a conventional cache memory module is installed, the pin to which the TMA channel would otherwise have been connected will have a predetermined voltage level, thereby indicating that a TMA is not present. Upon connecting a TMA to the host computer system, such as to the interface bus 24, however, the TMA will tie the TMA channel to ground, thereby providing an indication that a TMA is present. As such, by examining the TMA and BBMODE channels, the host computer system can determine if a TMA is present and, if so, the current mode of operation of the TMA.

In addition to the enablement of the battery backup mode of operation provided by BBEN 30, the power source selector 20 relies upon input from the voltage computer 19. As shown in FIG. 4, the voltage comparator includes a first comparator 19a for comparing the system power to a predetermined minimum system threshold 34. If the system power drops below the predetermined minimum system threshold, the first comparator provides a signal, designated PFAIL, to the power source selector and to the interface bus 24. Similarly, the voltage comparator includes a second comparator 19b for comparing the auxiliary power provided by the battery 23 to a predetermined minimum battery threshold 34 and for providing a signal 37, designated BADV3, if the auxiliary power falls below the predetermined minimum battery threshold. Based upon these inputs as well as BBEN, the power source selector provides the cache memory with system power or, in the event that system power fails or is otherwise unavailable, with auxiliary power from the battery. In the rare event that neither system power nor auxiliary power is available, the computer system will immediately initiate a power off sequence in order to avoid damaging the battery.

Figure 5:
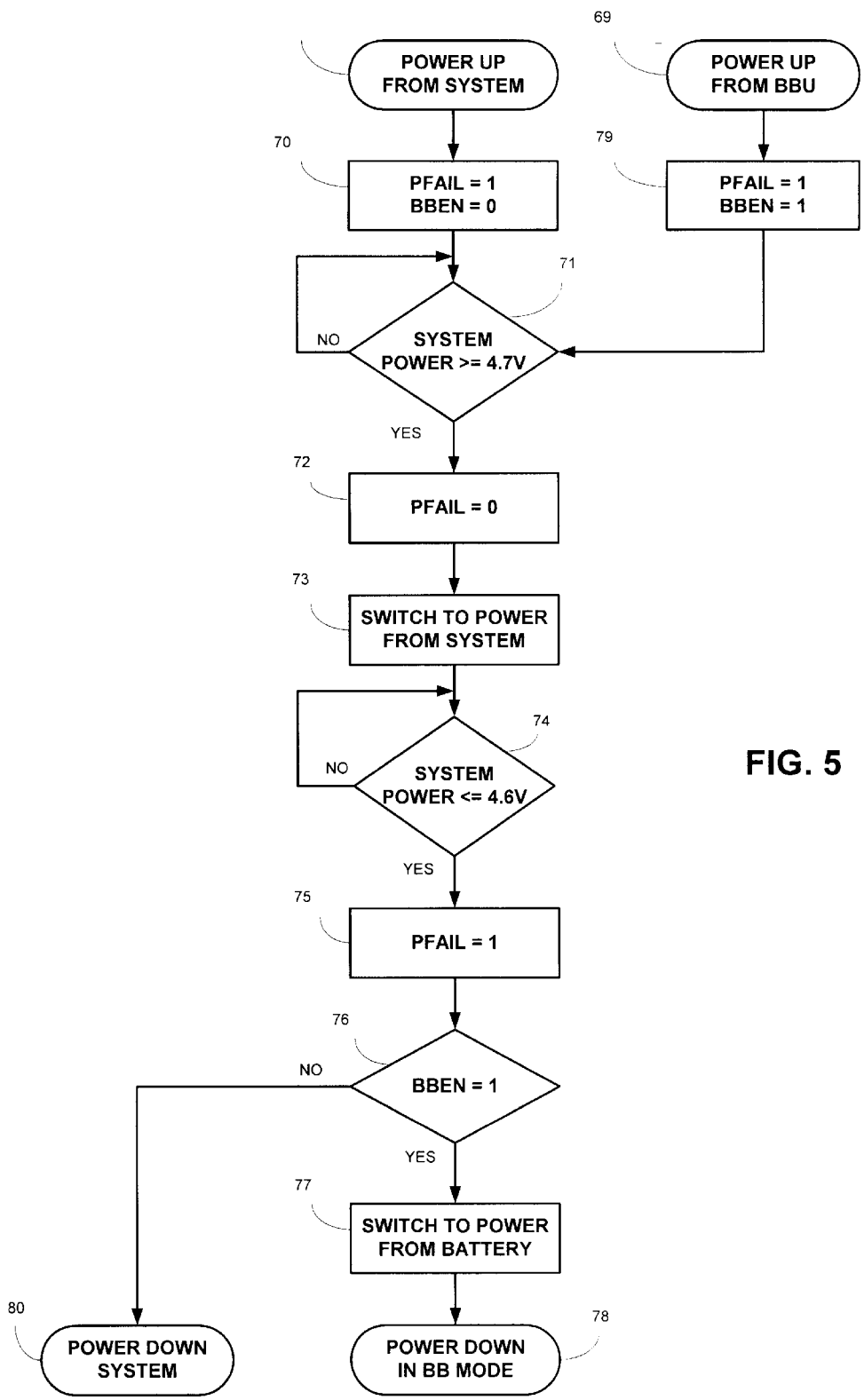
FIG. 5 is a top-level flow chart illustrating operations performed to switch between auxiliary power and system power.

In this regard, FIG. 5 depicts logic implemented by the power source selector 20. As shown, the host computer system 14 can be powered up in two different scenarios. In the first scenario, the computer system is powered down while operating under system power and is then subsequently activated or powered up at some time later as depicted in block 68. In the other scenario, the computer system is powered down while operating in battery backup mode with the auxiliary power being provided by the battery 23 and is then powered up at some later time as depicted in block 69. In either instance, system power will initially be less than the predetermined minimum system threshold 34 since the system power will need some time to ramp up to the desired level, such as 5 volts. In instances in which the computer system is being powered up after being previously powered down while operating under system power, the battery backup mode is generally not enabled as indicated by BBEN=0 in block 70. Conversely, in instances in which the computer system is being powered up after previously being powered down while operating in battery backup mode, the battery backup mode will be enabled as indicated by BBEN=1 in block 79.

In either instance, the voltage comparator 19 compares the system power to the predetermined minimum system threshold 34. As depicted in block 71 of FIG. 5, for example, the predetermined minimum system threshold can be 4.7 volts. Once the system power equals or exceeds the predetermined minimum system threshold, the PFAIL signal provided by the voltage comparator can be reset as depicted in block 72 which, in turn, triggers the power source selector 20 to provide system power to the cache memory 40 as opposed to auxiliary power from the battery 23 as depicted in block 73.

During operation of the computer system 14, the voltage comparator 19 continues to compare the system power to a predetermined minimum system threshold 34. While the voltage comparator can compare the system power to the same predetermined minimum system threshold both during initialization or powering up of the computer system and subsequently during operation of the computer system, the voltage comparator can be configured such that system power is compared to a slightly lower minimum operational threshold during operation of the computer system. As depicted in block 74 of FIG. 5, for example, the voltage comparator can compare the system power to a predetermined minimum operational threshold of 4.6 volts. If the system power falls below this predetermined minimum operational threshold, the voltage comparator will again set PFAIL to 1 as shown in block 75. Once PFAIL is set, the power source selector 20 will determine if the battery backup mode is enabled. As described above, the battery backup mode is typically enabled in instances in which cache memory 40 contains data that has not yet been stored or transferred to the memory storage device 12. By enabling the battery backup in instances in which the cache memory contains dirty data, the TMA 10 can maintain the integrity of the data in instances in which the system power fails or the computer system has some other type of failure. As such, upon receiving an indication that system power has failed as indicated by PFAIL being set to 1 as depicted in box 75, the power source selector detects if the battery backup mode has been enabled by determining if BBEN=1. If battery backup mode has not been enabled, thereby indicating that cache memory does not include dirty data, the computer system can be powered down under the remaining system power as indicated in block 80. If, however, battery backup mode is enabled indicating that cache memory contains dirty data, the power source selector switches the source of power to the cache memory from system power to the auxiliary power provided by the battery 23 as indicated in block 77 and then subsequently shuts down the computer system in battery backup mode as indicated in block 78.

As described above, the TMA 10 can be removed from a first computer system and installed in a second computer system. For example, in instances in which the first computer system fails while the cache memory 40 contains dirty data, the TMA and the memory storage device 12, such as one or more disk drives, can be installed or connected to a second computer system such that the dirty data can be downloaded to the memory storage device, thereby maintaining the integrity of the data. With the transportability of the TMA, however, the computer system 14 must be especially designed to detect the presence of a TMA and to distinguish a conventional cache memory module, and to appropriately configure the computer system depending upon the type of cache memory that is available. For example, the CPU 41 generally includes or is otherwise associated with a memory controller for controlling the manner in which the memory storage device, cache memory and other memory devices are accessed. During the initialization process, the memory controller must therefore be provided with information relating to the type and size of each memory device, including cache memory. In order to illustrate the process by which a computer system that may include a TMA according to the present invention is powered up and initialized, reference is now made to FIG. 6.

Figure 6:
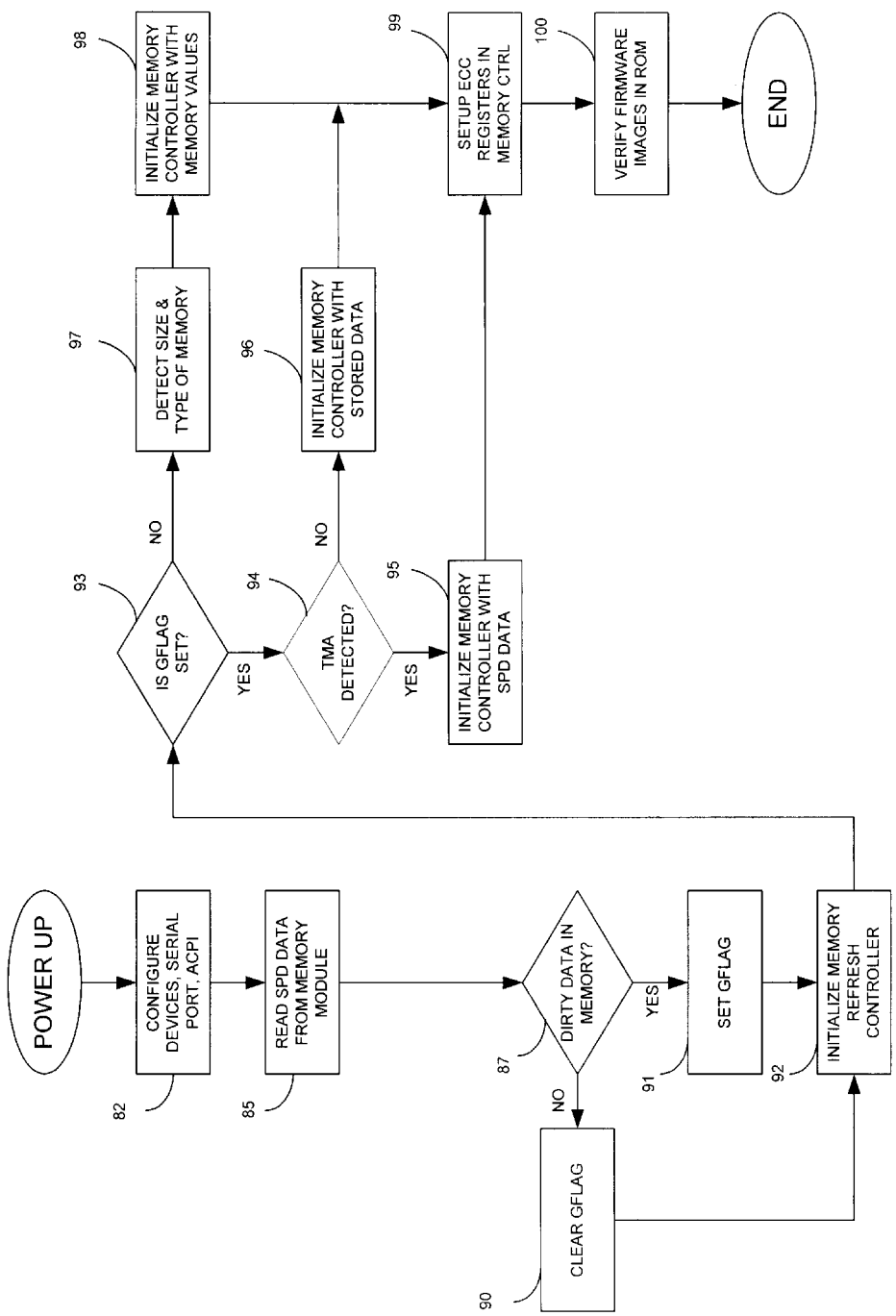
FIG. 6 is a flow chart illustrating the operations performed to initialize a computer system according to one embodiment of the present invention.

While the process depicted in FIG. 6 can be implemented in a number of different manners, the computer system 14 of one embodiment includes a non-volatile memory device 16 for storing a module of code or software that is called by the CPU 41 upon powering up of the computer system that defines the process of FIG. 6 as hereinafter described. As such, while the CPU will be described as performing many of the steps of the process of FIG. 6, the CPU is typically operating under control of a software module stored by the non-volatile memory device or elsewhere.

As shown in block 82, the various peripheral devices, serial ports and the advanced configuration and power interface (ACPI) are configured in a conventional manner. For example, the data control mechanism, such as a SCSI controller, that controls the reading and writing of data to and from the memory storage device 12 is appropriately configured. Thereafter, the CPU 41 reads data from the cache memory 40 that defines the size of memory, the type of memory, the number of banks and the like. See block 85. Typically, this data is termed Serial Presence Defect (SPD) data. Thereafter, the CPU determines if battery backup has been enabled and/or if cache memory contains dirty data. See block 87. For example, the CPU typically examines the BBEN channel of the control bus 22 to determine if the battery backup mode has been enabled. In addition, the CPU generally checks a flag that is maintained by the non-volatile memory device 16 that is set in instances in which the cache memory contains dirty data. If the BBEN channel and/or the flag maintained by the non-volatile memory indicate that the battery backup mode has been enabled and that the cache memory contains dirty data, the CPU sets another flag, designated GFLAG. See block 91. Alternatively, if the battery backup mode has not been enabled and the flag maintained by the non-volatile memory does not indicate that cache memory includes dirty data, the CPU clears GFLAG. See block 90.

Thereafter, the CPU 41 initializes the memory refresh controller. See block 92. Although not discussed in detail herein, the computer system 14 also includes a memory refresh controller and associated circuitry for periodically refreshing the data stored by the cache memory 40 to further preserve the integrity of the stored data. As known to those skilled in the art, in instances in which the computer system is being powered up or initialized while the cache memory contains dirty data, the data stored by cache memory should be refreshed sooner than instances in which cache memory does not include dirty data.

If the GFLAG has not been set indicating that the cache memory 40 does not contain dirty data and that battery backup mode has not been enabled, the CPU 41 actually examines the cache memory to determine its size, type and other related information. See blocks 93 and 97. The memory controller can then be initialized with the size, type and other information relating to the cache memory, as shown in block 98. Although not depicted in FIG. 6, the size, type and other information determined during an examination of cache memory may be compared to the SPD data and an error message can be generated if there are significant differences therebetween. In instances in which the GFLAG is set indicating that the battery backup mode is enabled and that the cache memory contains dirty data, the CPU will not be able to actually examine the cache memory itself since the examination process may destroy some of the dirty data. As such, the CPU initially determines if a TMA 10 is present or, alternatively, whether a conventional cache memory module is present. See block 94. In this regard, the CPU examines the TMA channel 29 of the control bus 22. In instances in which the TMA channel is grounded, the CPU will determine that a TMA is present. Conversely, in instances in which the TMA channel is high, the CPU will determine that the TMA is not present and a conventional cache memory module is, instead, installed. If the TMA is detected, the memory controller is initialized with the SPD data previously read from the cache memory since the SPD data is considered reliable. See block 95. If, however, the TMA is not detected and a conventional cache memory module is, instead, installed, the memory controller is initialized with data, typically defining the size, type and other characteristics of cache memory, that has been previously stored in the non-volatile memory device 16, since whatever SPD data that is collected from the conventional cache memory module may not be reliable. See block 96. Thereafter, the CPU initializes the ECC registers maintained by the memory controller to enable error checking and correction. See block 99. The CPU then verifies that the formware images in it internal read only memory (ROM) are correct and continues with the initialization process. See block 100. During this initialization process, dirty data maintained by the cache memory will be flushed to the memory storage device 12 once the various memory devices, including the cache memory, the memory storage device and the non-volatile memory device, are determined to be consistent as described in detail below.

Figure 7:
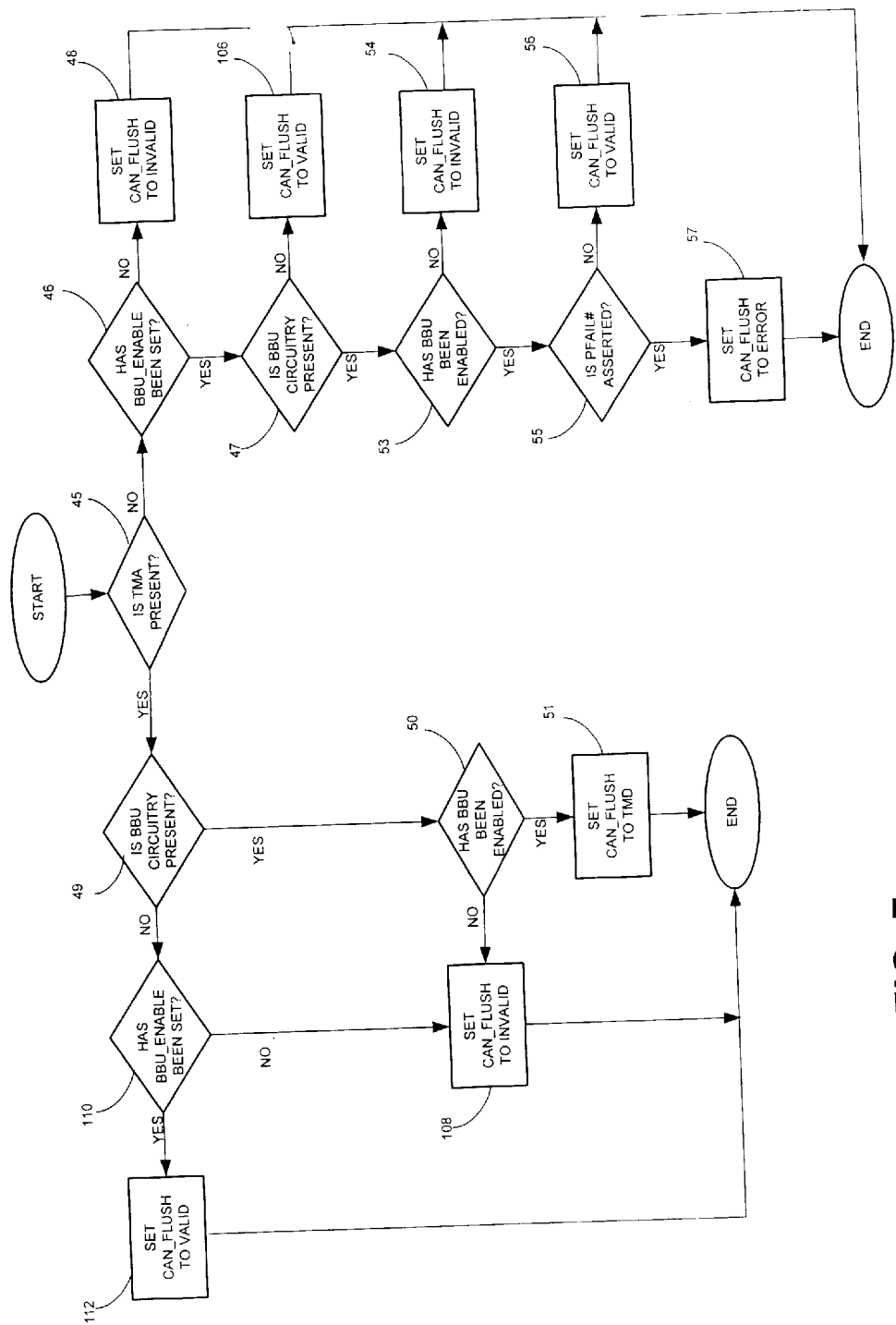
FIG. 7 is a flow chart illustrating the manner in which a flag is set during initialization operations to indicate that dirty data should be flushed from the cache memory according to one embodiment of the present invention.

In order to appropriately flush any dirty data from cache memory 40 to the memory storage device 12, the computer system 14 generally performs several additional tests as shown in FIG. 7 to ensure that only valid data will be flushed. While these tests can be performed following the initialization process depicted in FIG. 6, these tests can also be performed during or concurrent with the initialization process, if so desired. While the process depicted in FIG. 7 can be implemented in a number of different manners, the non-volatile memory device 16 of one embodiment can also store a module of code or software that is called by the CPU 41 upon powering up of the computer system that defines the process of FIG. 7 as hereinafter described. As such, while the CPU will be described as performing many of the steps of the process of FIG. 7, the CPU is typically operating under control of a software module stored by the non-volatile memory device or elsewhere.

As depicted in FIG. 7, these tests generally commence by determining if a TMA 10 is present in the same fashion as described above in conjunction with block 94 in FIG. 6. See block 45. If the TMA is present, the CPU 41 determines if battery backup circuitry is present, as shown in block 49. As generally understood, the battery backup circuitry is circuitry that is off-board from the TMA and that permits auxiliary power to be provided to a conventional cache memory module. In determining if battery backup circuitry is present for purposes of the process of FIG. 7, however, battery backup circuitry will only be considered to be present if both a battery 23 and the conventional battery backup circuitry are present. If the battery backup circuitry is present, the CPU determines if battery backup has been enabled by examining the BBMODE channel of the control bus 22. See block 50. If the battery backup mode has been enabled such as in instances in which the system power has been shut down while the cache memory 40 contains dirty data, the CPU sets a flag, typically designated Can_Flush and stored in the non-volatile storage medium 16, with a predetermined value designated TMD. See block 51. By setting this flag to TMD, the flag indicates that a TMA has been detected that includes a cache memory with dirty data that can be flushed. If the battery backup mode has not been enabled, the Can_Flush flag will be set, not to TMD, but to Invalid since no dirty data was present in the cache memory at the time that the computer system was previously powered down or since the battery was disconnected during the prior power off sequence. See block 108.

In instances in which the battery backup circuitry is not present, the CPU 41 still determines if the cache memory 40 contains dirty data, such as by examining a dirty cache flag set in the non-volatile memory device 16 in instances in which the cache memory contains dirty data. See block 110. If the dirty cache flag is set, the CPU sets the Can_Flush flag to Valid since the cache memory 40 contains dirty data that can be flushed to the memory storage device 12. See block 112. For example, the computer system may have undergone a warm boot, i.e., the user simultaneously depresses the CTRL, ALT and DEL keys, during a data transfer. If, however, the dirty cache flag is not set, the CPU sets the Can_Flush flag to Invalid since the cache memory does not include dirty data. See block 108.

If the CPU 41 initially determines that the TMA 10 is not present, the CPU also determines if the dirty cache flag is set as shown in block 46. If the dirty cache flag has not been set, the CPU sets the Can_Flush flag to Invalid since no dirty data remained in cache memory 40 at the time of the previous power down sequence. See block 48. If, however, the dirty cache flag has been set, the CPU determines if the battery backup circuitry is present as shown in block 47. If the battery backup circuitry is not present, the CPU sets the Can_Flush flag to Valid since the computer system has undergone a warm boot during data transfer and dirty data stored by the cache memory needs to be flushed to the memory storage device 12. See block 106. If the CPU determines that battery backup circuitry is present, however, the CPU determines if the battery backup mode has been enabled by examining the BBMODE channel. See block 53. If the battery backup mode has not been enabled, the CPU sets the Can_Flush flag to Invalid since the battery 23 was apparently disconnected at some point during the power down sequence and all data has already been lost. See block 54. If, however, the battery backup mode has been enabled, the CPU determines if the PFAIL signal provided by the voltage comparator 19 indicating a failure of system power has been asserted. See block 55. If PFAIL is asserted, the CPU sets the Can_Flush flag to Error since any data stored by the cache memory may be invalid, due to power brownouts or the like. See block 57. If the PFAIL signal is not asserted, however, the CPU sets the Can_Flush flag to Valid to permit subsequent flushing of the dirty data maintained by the cache memory since system power was apparently shut down during a prior data transfer. See block 56.

By setting or resetting the Can_Flush flag as described above, the CPU 41 appropriately initializes the computer system 14 including the TMA 10 such that dirty data stored by the cache memory 40 will be flushed to the memory storage device 12, if the Can_Flush flag is set either to Valid or TMD, thereby protecting the integrity of the data. Prior to flushing the dirty data to the memory storage device, however, the computer system preferably ensures that the memory devices, including the cache memory, the memory storage device and the non-volatile storage device 16, are all configured in a consistent manner. In this regard, a process implemented by the computer system for ensuring that the memory devices are consistently configured is depicted in FIG. 8 and is typically performed following the initialization routine depicted in FIG. 6.

Figure 8:
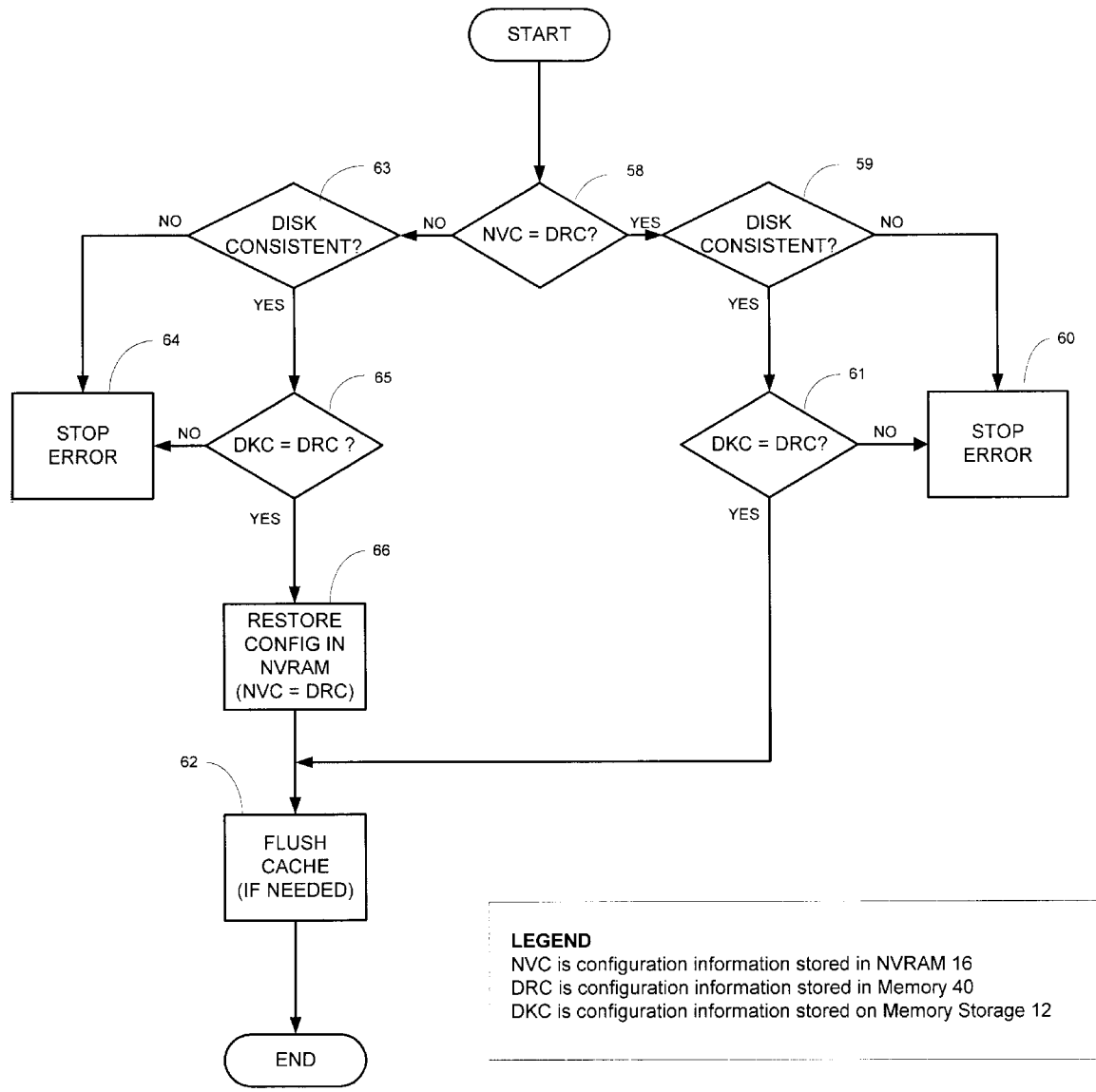
FIG. 8 is a flow chart illustrating operations performed during the initialization of a computer system to determine if the cache memory and the memory storage device are similarly configured before flushing the cache memory.

As depicted in block 58 of FIG. 8, the CPU 41 initially determines if the TMA has been moved from one computer system to another. In this regard, the CPU obtains the configuration information from the cache memory 40 and from the non-volatile storage device 16 for comparison purposes. Typically, this configuration information defines the manner in which the memory array is constructed. If the CPU determines that the configuration information stored by the cache memory and by the non-volatile storage device are the same, the CPU determines that the TMA has not been moved. The CPU then examines the memory storage device 12. In embodiments in which the memory storage device is comprised of a plurality of disk drives, the CPU next determines if the disk drives are consistent by comparing the configuration of information stored by each disk drive. See block 59. If the plurality of disk drives are not consistent, the CPU issues an error message. See block 60. If the plurality of disks are consistent, however, the CPU compares the configuration information of the cache memory and the memory storage device. See block 61. If the configuration information is the same, the CPU can determine that the same transportable memory apparatus and the same memory storage device were previously connected to the computer system during its most recent period of operation, i.e., prior to the last time that the computer system was powered down. Since the memory devices are appropriately configured, the CPU can then flush dirty data from the cache memory to the memory storage device, if necessary. See block 66. In this regard, the CPU examines the Can_Flush flag and if the Can_Flush flag is set to Valid or to TMD, the CPU institutes a transfer of the dirty data from cache memory to the memory storage device.

If the configuration information for the cache memory 40 and the memory storage device 12 are not the same, however, the CPU 41 can issue an error message as depicted in block 60. In this regard, a user may determine that a different set of disk drives has been connected to the computer system 14 since the last time that the computer system was operated. As such, the user can reinstall the prior set of disk drives such that the configuration information for the memory devices will then match and permit the dirty data from the cache memory to be transferred to the prior set of disk drives.

Alternatively, if the initial test set forth in block 58 determines that the configuration information for the cache memory 40 does not match the configuration information for the non-volatile memory device 16, the CPU 41 will determine that the TMA 10 has been moved from a first computer system to a second computer system following the powering down of the first computer system and prior to the powering up of the second computer system. The CPU will then examine the memory storage device 12 in the same manner as described in conjunction with block 59. In particular, in instances in which the memory storage device includes a plurality of disk drives, the CPU determines if the disk drives are consistent. See block 63. If the plurality of disk drives are not consistent, the CPU again issues an error message. See block 64. If, however, the plurality of disk drives are consistent, the CPU determines if the configuration information of the cache memory and the memory storage device match. See block 65. If the configuration information of the cache memory and the memory storage device match, such as in instances in which both the TMA and the memory storage device, such as a plurality of disk drives, are removed from a first computer system and installed on a second computer system, the CPU restores the configuration information in the non-volatile memory device 16. See block 66. In particular, the CPU copies the configuration information stored by the cache memory or by the memory storage device, to the non-volatile memory device such that all memory devices now have consistent configuration information. Thereafter, the dirty data can be flushed from the cache memory to the memory storage device, if necessary. See block 62. If, however, the configuration information of the cache memory does not match the configuration information of the memory storage device, the CPU again issues an error message. See block 64.

By appropriately determining that the memory devices are similarly configured prior to attempting to flush any dirty data, the computer system 14 of the present invention ensures that the dirty data is properly flushed from the cache memory 40 to a memory storage device 12, thereby preventing loss of the data or any impairment of the integrity of the data. In addition, by implementing the process described above and depicted in FIG. 8, the computer system permits the TMA 10 to be moved along with the memory storage device 12, such as a plurality of disk drives, from one computer system to another computer system, such as in instances in which the system power of the first computer system fails or the first computer system suffers some other type of hardware problem. As such, the dirty data can be retrieved in a reliable and repeatable fashion.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for initializing a first computer system that includes a host processor and a memory storage device, the method comprising:

determining if a transportable memory module is present;

if a transportable memory module is present, determining if configuration information stored by the transportable memory module and the memory storage device are consistent; and flushing any dirty data stored by the transportable memory module if the configuration information stored by the transportable memory module and the memory storage device are consistent;

wherein the dirty data comprises unwritten cache data.

2. A method according to claim 1 further comprising, if a transportable memory module is present, the step of determining if the transportable memory module has been transported from a second computer system to the first computer system.

3. A method according to claim 2, wherein the first computer system also includes a non-volatile memory device, and wherein determining if the transportable memory module has been transported from a second computer system to the first computer system comprises:

comparing configuration information stored by the transportable memory module and the non-volatile memory device;

determining that the transportable memory module has been transported if the configuration information stored by the transportable memory module and the non-volatile memory device are different; and determining that the transportable memory module has not been transported if the configuration information stored by the transportable memory module and the non-volatile memory device match.

4. A method according to claim 3 further comprising, if the transportable memory module has been transported from a second computer system to the first computer system and if the configuration information stored by the transportable memory module and the memory storage device are consistent, restoring the configuration information of the non-volatile memory device by copying the configuration information of the transportable memory module to the non-volatile memory device.

5. A method according to claim 4 wherein the memory storage device comprises a plurality of disks, and wherein the method further comprises checking consistency of the plurality of disks prior to determining if the configuration information stored by the transportable memory module and the memory storage device are consistent and issuing an error message if the plurality of disks are inconsistent.

6. A method according to claim 1 further comprising issuing an error message if the configuration information stored by the transportable memory module and the memory storage device are inconsistent.

7. A method according to claim 1 wherein determining the presence of the transportable memory module comprises examining an identification channel of a control bus interconnecting a transportable memory module with the first computer system which provides an indication that the transportable memory module is present.

8. An apparatus for initializing a first computer system that includes a host processor and a memory storage device, the method comprising:

first determination means for determining if a transportable memory module is present;

second determination means for determining if configuration information stored by the transportable memory module and the memory storage device are consistent if a transportable memory module is present; and flushing means for flushing any dirty data stored by the transportable memory module if the configuration information stored by the transportable memory module and the memory storage device are consistent;

wherein the dirty data comprises unwritten cache data.

9. An apparatus according to claim 8 further comprising third determination means for determination means for determining if the transportable memory module has been transported from a second computer system to the first computer system if a transportable memory module is present.

10. An apparatus according to claim 9, wherein the first computer system also includes a non-volatile memory device, and wherein the third determination means comprises:

means for comparing configuration information stored by the transportable memory module and the non-volatile memory device;

means for determining that the transportable memory module has been transported if the configuration information stored by the transportable memory module and the non-volatile memory device are different; and means for determining that the transportable memory module has not been transported if the configuration information stored by the transportable memory module and the non-volatile memory device match.

11. An apparatus according to claim 10 further comprising restoration means for restoring the configuration information of the non-volatile memory device by copying the configuration information of the transportable memory module to the non-volatile memory device if the transportable memory module has been transported from a second computer system to the first computer system and if the configuration information stored by the transportable memory module and the memory storage device are consistent.

12. An apparatus according to claim 11 wherein the memory storage device comprises a plurality of disks, and wherein the method further comprises:

means for checking consistency of the plurality of disks prior to determining if the configuration information stored by the transportable memory module and the memory storage device are consistent; and means for issuing an error message if the plurality of disks are inconsistent.

13. An apparatus according to claim 8 further comprising issuing an error message if the configuration information stored by the transportable memory module and the memory storage device are inconsistent.

14. An apparatus according to claim 8 wherein the first determination means comprises means for examining an identification channel of a control bus interconnecting a transportable memory module with the first computer system which provides an indication that the transportable memory module is present.

15. A computer program product, in a computer readable medium, for initializing a first computer system that includes a host processor and a memory storage device, the method comprising:

instructions for determining if a transportable memory module is present;

instructions for determining if configuration information stored by the transportable memory module and the memory storage device are consistent if a transportable memory module is present; and instructions for flushing any dirty data stored by the transportable memory module if the configuration information stored by the transportable memory module and the memory storage device are consistent;

wherein the dirty data comprises unwritten cache data.

\* \* \* \* \*